Sept. 20, 1971  C. D. CAMPBELL  3,605,195
MOLD ASSEMBLY FOR CASTING PLASTIC OPTICAL LENSES
Filed Aug. 24, 1970

INVENTOR.
CHARLES D. CAMPBELL
BY SELLERS and BRACE
ATTORNEYS

United States Patent Office 3,605,195
Patented Sept. 20, 1971

3,605,195
MOLD ASSEMBLY FOR CASTING PLASTIC OPTICAL LENSES
Charles D. Campbell, 3604 Bayonne Drive,
Pacific Beach, Calif. 92109
Filed Aug. 24, 1970, Ser. No. 66,228
(Filed under Rule 47(b) and 35 U.S.C. 118)
Int. Cl. B29c 5/00; B29d 11/00
U.S. Cl. 18—39         8 Claims

ABSTRACT OF THE DISCLOSURE

A gasket ring and mold assembly for casting plastic concavo-convex lenses so designed that the gasket ring can be assembled interchangeably either end up without adverse effects. The ring is of T-shape in cross section with the opposite sides of its T-stem oppositely sloped to one another so that either seats against the inner convex surface of the convex upper mold member or against the similarly but oppositely beveled upper rim edge of the lower concave mold member.

---

This invention relates to molded plastic lenses, and more particularly to an improved gasket ring and a mold assembly for casting concavo-convex plastic lenses with at least one optically finished surface.

Numerous vexing problems are encountered in the casting of plastic lenses arising in large part from the properties and characteristics of the monomer found suitable for this purpose. The most commonly used monomer is allyldiglycol carbonate, commonly known commercially under the trademark CR39. The catalyst isopropyl percarbonate is added to this monomer prior to charging the same into the mold assembly. Among the characteristics presenting problems is its high shrinkage factor of 14%, its pronounced tendency to adhere to the surface of the glass mold members, and its sensitivity to contact with air during polymerization.

Other problems confronting the manufacturer of plastic lenses concerned problems in the accurate positioning and support of the mold members with adequate safeguards against the entrance of air. Still another problem has involved the misassembly of the gasket ring between the mold members, that is, with the wrong end of the gasket uppermost resulting in the casting being mis-shapen and worthless.

The foregoing and other shortcomings of prior mold assemblies and the various gasket ring constructions provided therefor are avoided by the present invention wherein the parts are so designed as to provide maximum support and sealing of the juxtaposed surfaces as well as one in which the gasket cannot be mis-assembled.

To achieve these objectives the present invention employs a rigid lower concave mold member and an upper relatively thin convex mold member which may be flexible. Each mold member is substantially larger in diameter than the casting to be made in order that each may have a radially wide effective seating and air sealing surface with the gasket ring. To avoid any possibility of the gasket ring being misassembled the latter is of T-shape in cross section with the T-stem projecting inwardly and its opposite sidewalls sloping inwardly and toward one another generally in conformance with the slope of the inner convex surface of the upper mold member. The upper rim portion of the lower mold member is beveled complementally to the slope of the T-stem. In consequence the gasket ring is truly reversible and either surface of the T-stem seats on and seals equally effectively against the seating surfaces of either mold member.

The main body or T-head portion of the gasket ring protrudes axially for a distance corresponding generally to the thickness of the upper mold member to make maximum use of the sealing engagement with the periphery of the latter thereby safeguarding against any possibility of its lower end projecting below the lower rim corner of the thicker mold member and engaging a table top or other support for the mold assembly. Should the lower rim edge of the gasket ring approach the lower rim corner of the lower mold member it could be displaced upwardly out of seating engagement with the beveled portion of the lower mold member and result in an imperfect casting. A further feature of the gasket ring is the use of a radially long T-stem to assure a leak-proof wide seating surface with both mold members.

Accordingly it is a primary object of the present invention to provide an improved novel mold assembly for making concavo-convex plastic lenses.

Another object of the invention is the provision of an improved reversible gasket ring for use between a pair of mold members.

Another object of the invention is the provision of a resilient gasket ring for use between a pair of mold members and of T-shape in cross section with the opposite sides of its T-stem similarly sloped and arranged to seat and seal against the juxtaposed surfaces of the upper and lower mold members.

Another object of the invention is the provision of an improved mold assembly for casting plastic lenses utilizing a lower rigid mold member and an upper relatively thin flexible mold member together with a resilient separating ring usable interchangeably either end down with equal effectiveness.

These and other more specific objects will appear upon reading the following specification and claims and upon considering in connection therewith the attached drawing to which they relate.

Referring now to the drawing in which a preferred embodiment of the invention is illustrated:

Figure 1:
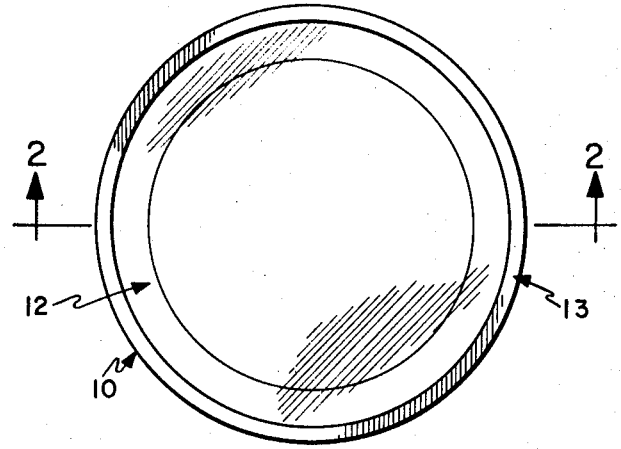
FIG. 1 is a top plan view of the mold assembly ready for use.
Figure 2:
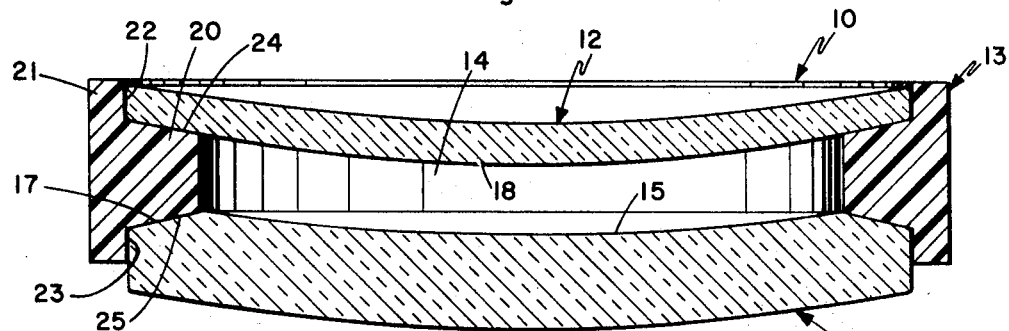
FIG. 2 is a cross sectional view on an enlarged scale taken along line 2—2 on FIG. 1.

Referring initially more particularly to FIGS. 1 and 2, there is shown a preferred embodiment of the invention mold assembly, designated generally 10, comprising a lower concavo mold member 11, and upper convex mold member 12, and a resilient gasket ring 13. Lower mold member 11 is usually formed of glass and is sufficiently thick as to remain rigid and resist flexing during curing of the plastic charge in mold cavity 14. As herein shown, mold member 11 is formed with a highly polished precise concave surface 15 to form a lens having a corresponding surface free of imperfections and ready for use as a precision optical surface. The upper rim portion of member 11 is beveled outwardly and downwardly to provide a flat surface 17 for a purpose which will be described more fully presently.

Upper mold member 12 is relatively thin and has a thickness in a preferred embodiment of 2 to 3 mils. Its lower side has an accurately finished optical convex surface 18 having a radius differing slightly from that desired in the finished convex surface of casting formed in cavity 14. Mold member 12 may be made of specially treated glass to give it high strength and flexibility. An example of this type of glass is sold commercially by Pittsburgh Plate Glass Co., under the trade name Herculite. Alternatively, upper member 12 may be formed of plastic in accordance with the teachings in Robert K. Lanman Patent 3,211,811.

Figure 3:
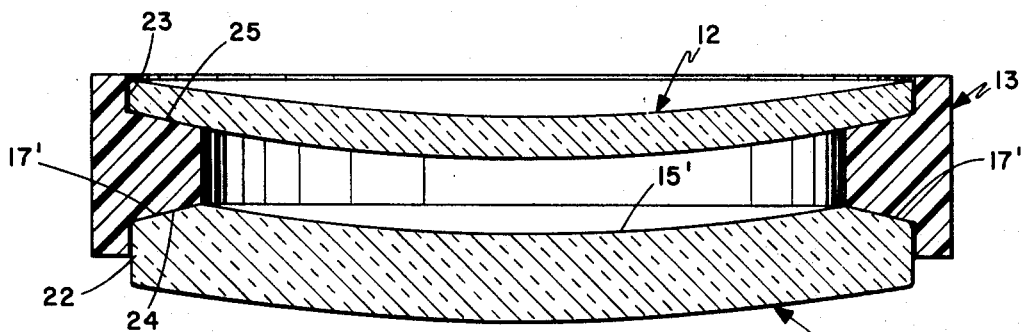
FIG. 3 is a view similar to FIG. 2 but showing a lower mold member having its upper surface finished with a curvature of shorter radius.

Gasket ring 15 is generally T-shaped in cross section, as clearly appears from FIGS. 2 and 3 and, as herein illustrated, includes a thick radially long T-stem 20 and a T-head 21 having an axial extent substantially less than the overall height of the mold assembly. In particular, the axial projection of the T-head beyond T-stem 20 is preferably equivalent to the thickness of the upper flexible mold member 12. This assures that surface 22 will be coextensive with the peripheral edge of mold member 12 and provide maximum sealing effectiveness with that surface. Any greater projection of the T-head serves no useful purpose and risks the possibility that its downward projection will be great enough to contact a surface for supporting the mold assembly. In this event contact of the lower rim of the gasket with the support surface could displace the gasket ring upwardly and away from sealing contact with beveled surface 17 of lower mold element 11. This would result in an imperfect casting for obvious reasons.

T-stem 20 of the gasket ring is provided with upper and lower surfaces 24, 25 which converge toward one another at the same angle relative to a bisector plane through the T-stem. This angle is selected to conform with or approximate the slope of the adjacent portion of surface 18 of upper mold member 12. This slope having been determined, the lower mold member 15 is formed with a beveled surface 17 of the same but opposite slope angle. It follows from the foregoing that gasket ring 13 can be assembled interchangeably either end up between the two mold members. Thus, in FIG. 2, the gasket ring is assembled with surface 24 uppermost whereas in FIG. 3, surface 25 is uppermost.

The mode of using the described mold assembly 10 will be readily apparent from the foregoing. The parts having been thoroughly cleaned are assembled as shown in FIG. 2 or 3. As therein shown, the optically finished surfaces 15, 18 are of different radii, the radius of surface 15 being substantially greater than that of surface 18. However, it will be understood that the radius of the two surfaces may vary over a considerable range without adverse effect on the effectiveness and efficiency of the described gasket ring 13.

The parts having been assembled cavity 14 may be charged with monomer by any conventional technique as, for example, by lifting one rim edge of mold member 12 and inserting a charging spout for the monomer until the cavity overflows and then reseating the mold member firmly against the seating surface of the gasket ring. Alternatively, the cavity may be charged by a suitably designed hypodermic syringe having provision for bleeding air from the cavity as the air is replaced with monomer. This technique has the advantage of minimizing the risk of introducing foreign matter and more particularly of avoiding trapping excess monomer between the inner surface of mold member 12 and its leading surface on the T-stem of the gasket. Should this occur, an imperfect casting is formed.

Figure 4:
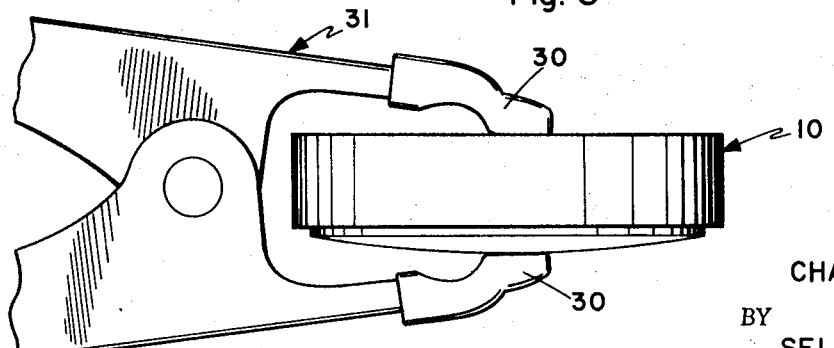
FIG. 4 is a view of the mold assembly held closed by a clamping device.

After the mold has been charged as described, the assembly is preferably placed between the jaws 30 of the spring-loaded clamping tongs 31 in the manner shown in FIG. 4. This assures that the mold parts will be held firmly assembled during the curing operation which takes place in an oven or a water bath in accordance with curing practices well known to those skilled in this art. After the charge has been cured the assembly is removed from the oven, tongs 31 are detached, and the mold is separated to release the finished casting. The mold parts are then inspected, cleaned of foreign matter and reassembled for the next casting operation without need or care on the part of the operator to make certain that gasket 13 is assembled to the lower mold member with either end uppermost. Furthermore, it will be understood that the same gasket ring may be used with a range of differently contoured concavo-convex mold members 11, 12.

A typical alternate mold assembly is illustrated in FIG. 3, this assembly differing from that just described in that lower mold member 11′ has an optically finished surface 15′ of shorter radius than surface 15 of member 11 in FIGS. 1 and 2. In all other respects, the two mold assemblies are essentially the same in construction and operating principle. It will also be observed that, in FIG. 3, gasket ring 13 has been assembled inverted from the position shown in FIG. 2.

While the particular mold assembly for casting plastic optical lenses herein shown and disclosed in detail is fully capable of attaining the objects and providing the advantages hereinbefore stated, it is to be understood that it is merely illustrative of the presently preferred embodiments of the invention, and that no limitations are intended to the details of construction or design herein shown other than as defined in the appended claims.

I claim:

1. A mold assembly for use in casting a precision plastic optical lens, said mold assembly comprising a lower mold member having a polished concave surface bounded by an annular beveled surface sloping outwardly and downwardly away from the rim of said concave surface, an upper mold member having a convex surface facing toward said concave surface, a resilient gasket ring for holding said mold members firmly assembled in predetermined spaced apart relation with either end of said ring facing upwardly, said gasket ring having an inwardly projecting flange formed with radial annular surfaces sloping similarly but oppositely to one another with one thereof engaging and supporting the juxtaposed convex surface of said convex mold member and the other sloping surface engaging and resting against the juxtaposed beveled surface encircling the rim of said concave surface of said lower mold member.

2. A mold assembly as defined in claim 1 characterized in that said lower mold member is relatively thick and rigid and in that said upper mold member is relatively thin and flexible.

3. A mold assembly as defined in claim 2 characterized in that the said gasket ring projects substantially equal axial distances from the adjacent outer edge of said flange.

4. A mold assembly as defined in claim 2 characterized in that the lower axial end of said gasket ring is spaced substantially above the lower rim edge of said lower mold member when the latter is fully assembled to the gasket ring whereby said lower mold member may be supported on a flat surface without risk of the gasket ring being elevated from its assembled position relative to the lower mold member.

5. A mold assembly as defined in claim 2 characterized in that said inwardly projecting flange provides seating surfaces for said upper and lower mold members having a radial width corresponding generally to the thickness of said lower mold member.

6. A resilient gasket ring for use to hold a pair of convex-concave mold members in precise spaced apart relation and cooperating with the mold members to form a fluid-tight cavity for molding a convex-concavo plastic optical element, said gasket ring being molded in one piece from suitable elastomeric material and having a generally T-shaped cross section with the T-stem thereof projecting radially inwardly, said T-stem having upper and lower walls sloping inwardly toward one another substantially at the same angle relative to a right bisector plane through said T-stem and each adapted to have surface-to-surface seating contact with the inner surface of either the upper or the lower one of a pair of convex-concavo mold members and the lower one of which has its rim portion beveled complementally to the slope on said T-stem, whereby said ring is usable interchangeable either end up between a lower mold member and an upper mold member.

7. A gasket ring as defined in claim 6 characterized in that the opposite ends of the T-head portion of said ring project axially at the sides of said T-stem a distance of a few millimeters and corresponding generally to the thickness of said upper mold member.

8. A gasket ring as defined in claim 7 characterized in that the radial length of said T-stem is in excess of double the axial extension of said T-head beyond its junction with the T-stem.

References Cited

UNITED STATES PATENTS

| | | | |
|---|---|---|---|
| 2,964,501 | 12/1960 | Sarofeen | 264—1X |
| 3,056,166 | 10/1962 | Weinberg | 18—39 |
| 3,136,000 | 6/1964 | Slyk | 18—Lens mold dig. |
| 3,278,654 | 10/1966 | Grandperret | 18—Lens mold dig. |
| 3,331,102 | 7/1967 | Mignen | 18—34R |
| 3,404,861 | 10/1968 | Ewer | 18—39X |
| 3,460,928 | 8/1969 | Casko | 18—Lens mold dig. |
| 3,528,135 | 9/1970 | Reiterman | 18—39 |

J. HOWARD FLINT, Jr., Primary Examiner

U.S. Cl. X.R.

18—Lens mold dig.; 249—187R; 264—1